(12) United States Patent  
Aguirre et al.

(10) Patent No.: US 8,639,285 B2  
(45) Date of Patent: Jan. 28, 2014

(54) COMMAND INTERFACE FOR OUTDOOR BROADBAND UNIT

(75) Inventors: Sergio Aguirre, Southlake, TX (US); Raafat Edward Kamel, Little Falls, NJ (US); Kamlesh S. Kamdar, Dublin, CA (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 327 days.

(21) Appl. No.: 13/087,481

(22) Filed: Apr. 15, 2011

(65) Prior Publication Data

US 2012/0264367 A1    Oct. 18, 2012

(51) Int. Cl.  
*H04M 1/00*    (2006.01)

(52) U.S. Cl.  
USPC ........................................ 455/552.1; 725/110

(58) Field of Classification Search  
USPC .................. 455/561, 556.1, 557, 3.02, 552.1  
See application file for complete search history.

(56) References Cited

U.S. PATENT DOCUMENTS

| | | |
|---|---|---|
| 2005/0179607 A1 | 8/2005 | Gorsuch et al. |
| 2007/0173303 A1 | 7/2007 | Viorel et al. |
| 2010/0311321 A1 | 12/2010 | Norin |
| 2010/0313232 A1 | 12/2010 | Norin |

*Primary Examiner* — Tu X Nguyen

(57) ABSTRACT

An outdoor broadband unit implements a library of commands to communicate between a wide area network (WAN)-side Long-Term Evolution (LTE) module and a local area network (LAN)-side broadband home router within the outdoor broadband unit. The commands are used for control plane operations to facilitate LTE network sessions for individual devices within a customer premises LAN. In some cases, the commands are also used for communicating with a remote device manager.

20 Claims, 9 Drawing Sheets

COMMAND INTERFACE FOR OUTDOOR BROADBAND UNIT

BACKGROUND INFORMATION

Bundled media services (e.g., combination packages of television, telephone, and broadband Internet services) have been successfully offered to households with wired connections to service provider networks. Households in areas without such wired connections (e.g., customer in regions that cannot be reached via conventional communication media, such as optical cables, copper cables, and/or other fixed wire-based technologies) may rely on fixed wireless services for some of these services (e.g., broadband access). Fixed wireless services can be made more attractive to customers by effectively leverage existing customer premises equipment (CPE).

DETAILED DESCRIPTION OF PREFERRED EMBODIMENTS

The following detailed description refers to the accompanying drawings. The same reference numbers in different drawings identify the same or similar elements.

Systems and/or methods described herein may include an outdoor broadband unit that implements a library of commands to communicate between a wide area network (WAN)-side Long-Term Evolution (LTE) module and a local area network (LAN)-side broadband home router (BHR) within the outdoor broadband unit. The commands may be used for control plane operations to facilitate LTE network sessions for individual devices within a customer premises LAN. In another implementation, the commands may be used for communicating with a remote device manager.

In one implementation, the systems and/or methods may include a satellite antenna to receive communications from a satellite network and an outdoor broadband unit connected to an external portion of a customer premises along with the satellite antenna. The outdoor broadband unit may combine broadband communication signals with satellite communication signals to provide a single point of entry for a customer premises network. The outdoor broadband unit may include a radio frequency (RF) antenna to receive communications from a LTE network; a coaxial network controller to provide an interface to a LAN, associated with the customer premises, for Ethernet over coaxial signals; a LTE module; and a broadband home router. The LTE module may implement an air interface for the LTE network and may include a library of commands associated with control plane functions for a LTE radio link. The broadband home router may route traffic, from the LAN, to the LTE module and may provide one or more of the commands to the LTE module to implement control plane functions for the LTE network, based on activity within the LAN.

Figure 1:
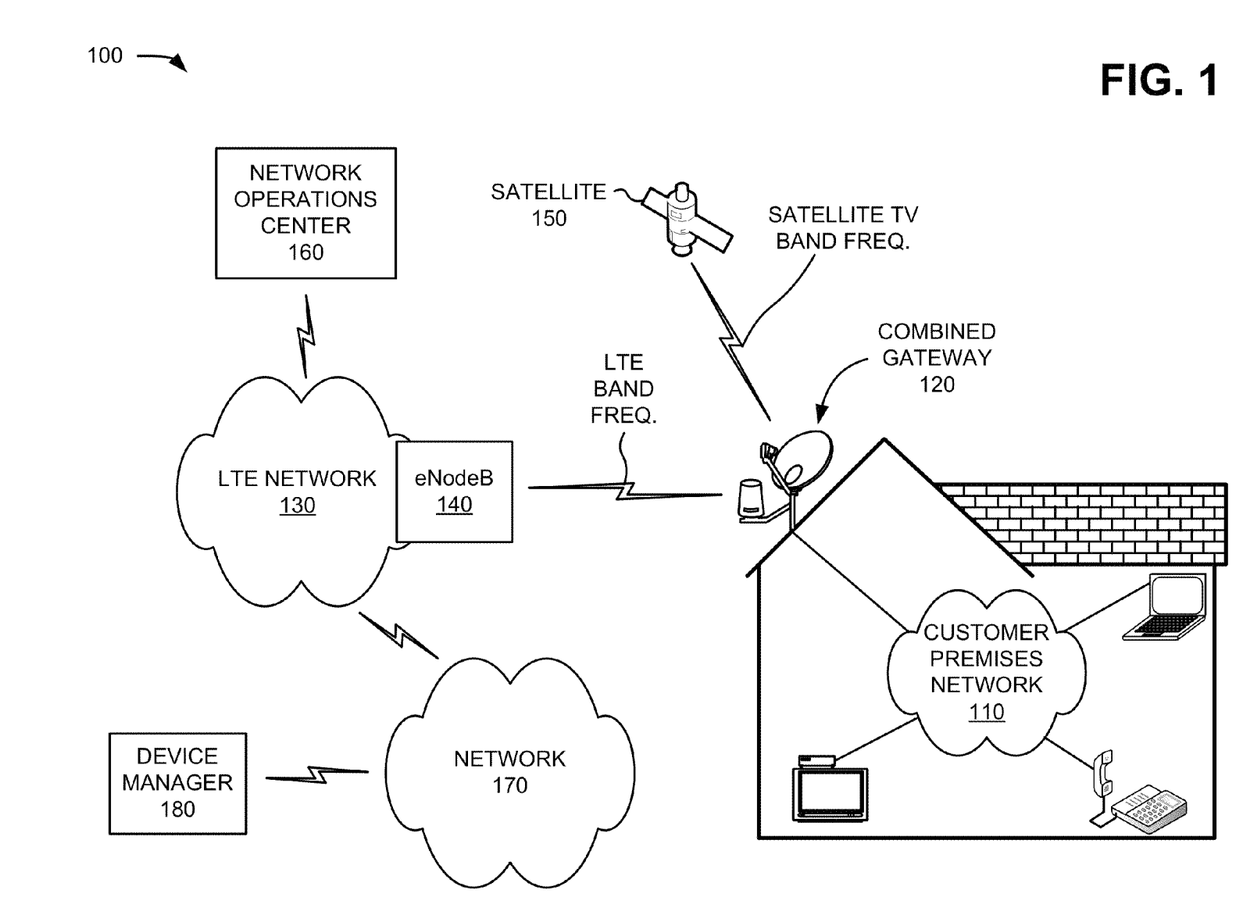
FIG. 1 is a diagram of a system according to an implementation described herein.

FIG. 1 is a diagram of a system 100 according to an implementation described herein. As shown in FIG. 1, system 100 may include customer premises network 110, gateway equipment 120, a LTE network 130, an eNodeB 140, a satellite 150, a network operations center 160, a network 170, and a device manager 180.

Customer premises network 110 may include one or more devices connected via a customer premises network. Devices in customer premises network 110 may include, for example, set-top boxes (STBs), televisions, computers, voice-over-Internet-protocol (VoIP) devices, home networking equipment (e.g., routers, cables, splitters, local gateways, etc.), gaming devices, etc. Devices within customer premises network 110 may be connected via wired connections (e.g., coaxial cable, Telecommunications Industry Association (TIA) category 5 ("Cat 5") cable, TIA Cat 3 cable, etc.) and/or wireless connections (e.g., using network devices such as those available under the IEEE 802.11 wireless LAN standards). In the example shown in FIG. 1, customer premises network 110 is connected to eNodeB 140 through a two-way wireless connection (e.g., using a LTE band frequency) and connected to satellite network 150 through a one-way (e.g., downlink) wireless connection (e.g., using a satellite TV band frequency). The two-way wireless connection and the one-way wireless connection may be implemented using combined gateway equipment 120.

Combined gateway equipment 120, which is described in more detail below, may generally include mechanisms for communicating with satellite 150 (to provide satellite-based communications) and for communicating with eNodeB 140 (to provide terrestrial RF-based communications). Communications from satellite 150 may be received by a satellite antenna in combined gateway equipment 120, while communications from/to eNodeB 140 may be received/sent by an outdoor broadband unit in combined gateway equipment 120. Combined gateway equipment 120 may connect, such as via a coaxial connection, to devices inside of the customer premises, such as the devices connected to customer premises network 110.

LTE network 130 may include a core network architecture of the Third Generation Partnership Project (3GPP) LTE wireless communication standard (e.g., an evolved packet core (EPC) network). LTE network 130 may include a packet-switched core network that supports high-speed wireless and wireline broadband access technologies. Additionally, LTE network 130 may provide packet-switched voice services (e.g., which are traditionally circuit-switched) using an Internet Protocol Multimedia Subsystem Multimedia Subsystem (IMS) network (not shown in FIG. 1). LTE network 130 may include an Evolved NodeB (eNodeB) 140. In addition, LTE network 130 may include one or more other network devices (not shown), such as one or more mobility management entities (MMEs), serving gateways (SGWs), packet data network (PDN) gateways (PGW), and/or other devices.

eNodeB 140 may include a LTE base station that may cover a particular geographic area serviced by LTE network 130. eNodeB 140 may include one or more devices that receive information, such as voice, video, text, and/or other data, from network devices and/or that transmit the information to customer premises 110 via an air interface. eNodeB 140 may also include one or more devices that receive information from devices in customer premises 110 via an air interface and/or that transmit the information to other network devices.

Satellite 150 may provide multimedia content from, for example, a direct broadcast satellite (DBS) service provider (not shown in FIG. 1). Satellite 150 may provide a downlink signal over a designated satellite TV band frequency (e.g., in the range of 950 megahertz (MHz) to 2150 MHz). The downlink signal may be received using a satellite antenna/receiver system at customer premises 110 to present satellite TV content to a user.

Network operations center 160 may include one or more devices (e.g., server devices) from which administrators supervise, monitor, and maintain system 100. For example, network operations center 160 may be responsible for analyzing problems in system 100 (including issues with an outdoor broadband unit of combined gateway 120), performing troubleshooting, communicating with site technicians and other network operations centers, and tracking problems through to resolution. Network operations center 160 may connect to LTE network 130 via wired and/or wireless connections.

Network 170 may include a local area network (LAN), a wide area network (WAN), a metropolitan area network (MAN), a telephone network, such as the Public Switched Telephone Network (PSTN), a cellular network, a Wi-Fi network, an intranet, the Internet, an optical fiber (or fiber optic)-based network, or a combination of these or other types of networks.

Device manager 180 may include one or more server devices that manage the operation of the outdoor broadband unit at combined gateway 120. For example, device manager 180 may maintain data regarding the operation of the outdoor broadband unit, generate one or more reports based on the maintained data, and provide the generated reports to one or more devices, such as a user device in customer premises network 110 and/or network operations center 160. In addition, device manager 180 may maintain configuration information for the outdoor broadband unit and provide the configuration information to the outdoor broadband unit. For example, device manager 180 may receive, on a periodic basis, configuration information associated with the outdoor broadband unit. The periodic basis may be every twenty-four hours, every thirty-six hours, or some other time period. The configuration information may correspond, for example, to a customer's outdoor broadband unit configuration settings. Thus, in those situations where the outdoor broadband unit must be reset, the outdoor broadband unit may be reconfigured with the customer's prior configuration settings. Device manager 180 may connect to network 170 via wired and/or wireless connections.

In implementations described herein, customer premises network 110 may combine LTE functionality with satellite TV service. Using combined gateway equipment 120, both broadband (over LTE) service (e.g., via eNodeB 140) and satellite TV service (e.g., via satellite 150) may be brought into customer premises network 110 over a single coaxial line. This architecture may reduce equipment installation time due to the use of a single coaxial line for all the services. Both installation costs and recurrent operational costs can be reduced.

While implementations herein are described primarily in the context of broadband services via LTE, other wireless protocols may be used. For example, components conforming to LTE standards described herein may be replaced by components conforming to other network protocols (e.g., Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax), etc.).

Although FIG. 1 shows example components of system 100, in other implementations, system 100 may include fewer components, different components, differently arranged components, and/or additional components than those depicted in FIG. 1. Alternatively, or additionally, one or more components of system 100 may perform one or more tasks described as being performed by one or more other components of system 100.

Figure 2:
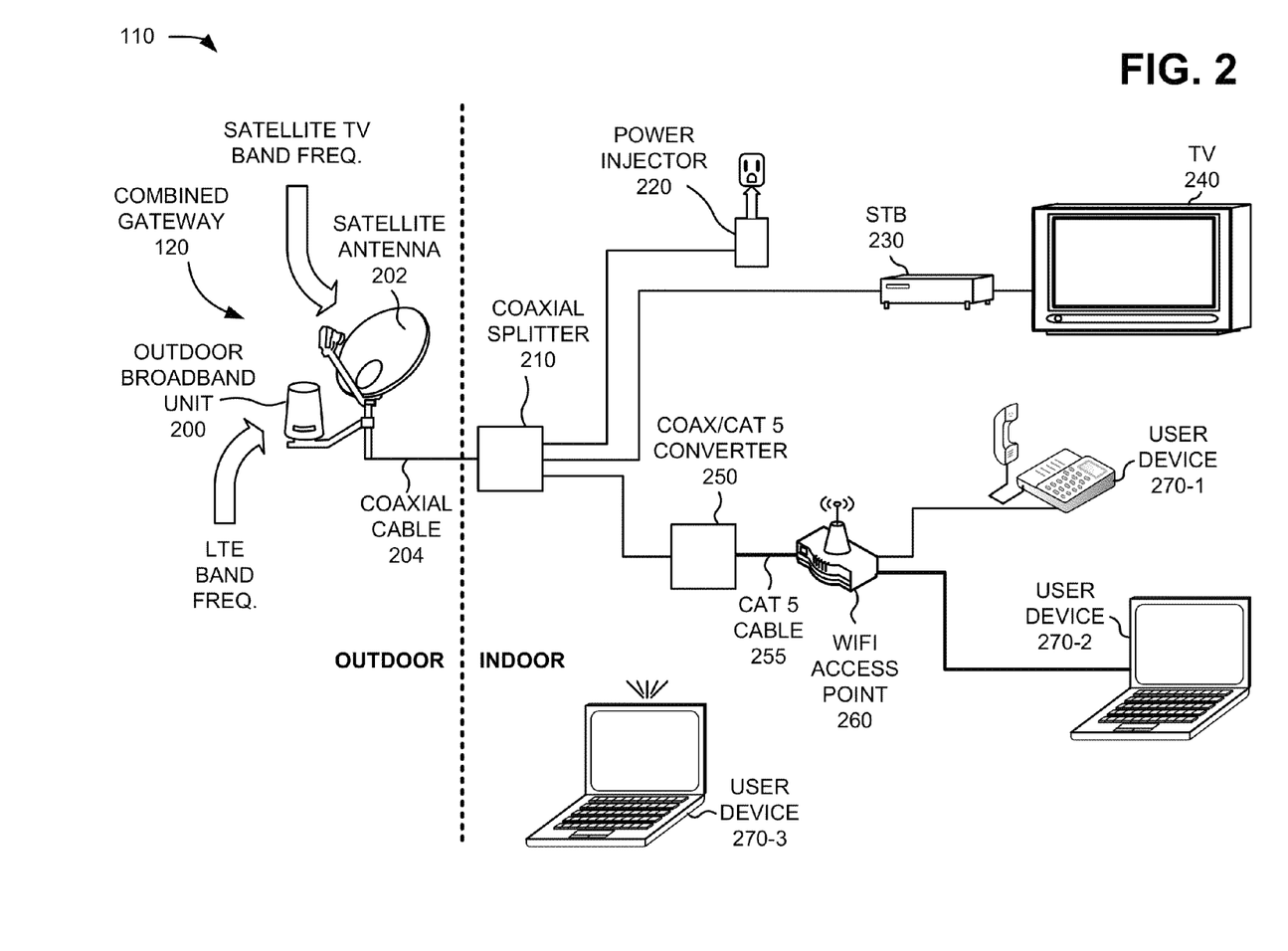
FIG. 2 is a diagram of a customer premises of FIG. 1 according to an implementation described herein.

FIG. 2 is a diagram of customer premises network 110 according to an implementation described herein. As illustrated, combined gateway equipment 120 of customer premises network 110 may include an outdoor broadband unit 200 and a satellite antenna 202. A coaxial cable 204 may connect combined gateway equipment 120 to the indoor portion of customer premises network 110. Customer premises network 110 may further include a coaxial splitter 210, a power injector 220, a STB 230, a television 240, a coax/Cat 5 converter 250, a local router 260, and user devices 270-1, 270-2, and 270-3 (referred to herein collectively as "user devices 270" or individually as "user device 270"). One outdoor broadband unit 200, one coaxial splitter 210, one power injector 220, one STB 230, one television 240, one coax/Cat 5 converter 250, one local router 260, and three user devices 270 have been illustrated in FIG. 2 for simplicity. In practice, there may be more (or fewer) outdoor broadband units 200, satellite antennas 202, coaxial splitters 210, power injectors 220, STBs 230, televisions 240, coax/Cat 5 converters 250, WiFi access points 260, and/or user devices 270.

Outdoor broadband unit 200 may include one or more data processing and/or data transfer devices, such as a gateway, a router, a modem, a switch, a firewall, a network interface card, a hub, a bridge, a proxy server, an optical add-drop multiplexer (OADM), and/or some other type of device that processes and/or transfers data. In one example, outdoor broadband unit 200 may include a wireless gateway that provides a convergence point between wireless protocols (e.g., associated with eNodeB 140) and IP protocols (e.g., associated with user devices 270). Outdoor broadband unit 200 may be physically deployed with satellite antenna 202 (e.g., on a roof or a side wall of a house associated with customer premises network 110) as part of combine gateway equipment 120. For example, outdoor broadband unit 200 may utilize a pre-existing or new satellite TV installation in a way that both broadband (over LTE) service and satellite TV are brought indoors (e.g., inside the customer premises) over, for example, a coaxial cable 204. Additionally, or alternatively, outdoor broadband unit 200 may be a Technical Report 069 (TR-069) enabled device to support CPE WAN Management Protocol (CWMP). Components of outdoor broadband unit 200 may also be powered using coaxial cable 204.

Satellite antenna 202 may provide an interface for television service broadcast from satellites. In one implementation, satellite antenna 202 may provide an entry point for a network (e.g., customer premises network 110) that conforms to standards of the Multimedia over Coax Alliance (MoCA). Generally, MoCA-compliant devices may be used to implement a home network on existing coaxial cable, using, for example, orthogonal frequency-division multiplexing (OFDM) modulation that divides data into several parallel data streams or logical channels. Channel stacking technology, such as the Single Wire Multiswitch (SWiM) technology, may be used to allocate logical channels using frequency blocks for user-selected programming to the SWiM compatible devices (e.g., STBs 230). Satellite antenna 202 may communicate with STB 230 to identify which blocks of channels can be used to send television signals to that particular STB 230.

Coaxial splitter 210 may include splitting technologies to filter LTE and satellite TV signals. In one implementation, coaxial splitter 210 may include a SWiM splitter. For example, coaxial splitter 210 may facilitate allocating logical channels using different frequency blocks for viewer-selected television programming and broadband signals to SWiM-compatible STB 230 and/or Local router 260.

Power injector 220 may include a mechanism for injecting DC power in a coaxial cable to power remotely-located devices, such as outdoor broadband unit 200. Use of power injector 220 may allow components of outdoor broadband unit 200 to be powered via a coaxial cable (e.g., coaxial cable 204) and eliminate the need for additional wiring. In one implementation, power injector 220 may include an on-off switch (or button).

STB 230 may include a device that receives and/or processes video content (e.g., from a satellite TV provider via satellite antenna 202), and provides the video content to television 240 or another device. STB 230 may also include decoding and/or decryption capabilities and may further include a digital video recorder (DVR) (e.g., a hard drive). In one implementation, STB 230 may conform to MoCA and SWiM standards.

Television 240 may include a television monitor that is capable of displaying video content, television programming, content provided by STB 230, and/or content provided by other devices (e.g., a digital video disk (DVD) player, a video camera, etc., not shown) connected to television 240. Coax-to-Cat 5 adapter 250 may include a device to convert incoming signals from coaxial cables to outgoing signals on Cat 5 cables, such as cat 5 cable 255.

Local router 260 may include a device that may provide connectivity between equipment within customer premises (e.g., user devices 270) and between the customer premises equipment and an external network (e.g., network 130). In one implementation, local router 260 may include a wireless access point that employs one or more short-range wireless communication protocols for a wireless personal area network (WPAN) and/or a wireless local area network (WLAN), such as, for example, IEEE 802.15 (e.g., Bluetooth) and IEEE 802.11 (e.g., Wi-Fi). In other implementations, different short-range wireless protocols and/or frequencies may be used. Local router 260 may also include one or more wired (e.g., Ethernet) connections. In one implementation, local router 260 may include a USB Ethernet Router that is capable of meeting LTE quality of service (QoS) standards.

User devices 270 may include any device that is capable of communicating with customer premises network 110 via local router 260. For example, user device 270 may include a mobile computation and/or communication device, such as a laptop computer, a VoIP-enabled device, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device, a smart phone, a global positioning system (GPS) device, a content recording device (e.g., a camera, a video camera, etc.), etc. In another example, user device 270 may include a fixed (e.g., provided in a particular location, such as within a customer's home) computation and/or communication device, such as a VoIP-enabled device phone base, a personal computer, a gaming system, etc.

Although FIG. 2 shows example components of customer premises network 110, in other implementations, customer premises network 110 may include fewer components, different components, differently arranged components, and/or additional components than those depicted in FIG. 2. Alternatively, or additionally, one or more components of customer premises network 110 may perform one or more tasks described as being performed by one or more other components of customer premises network 110.

Figure 3:
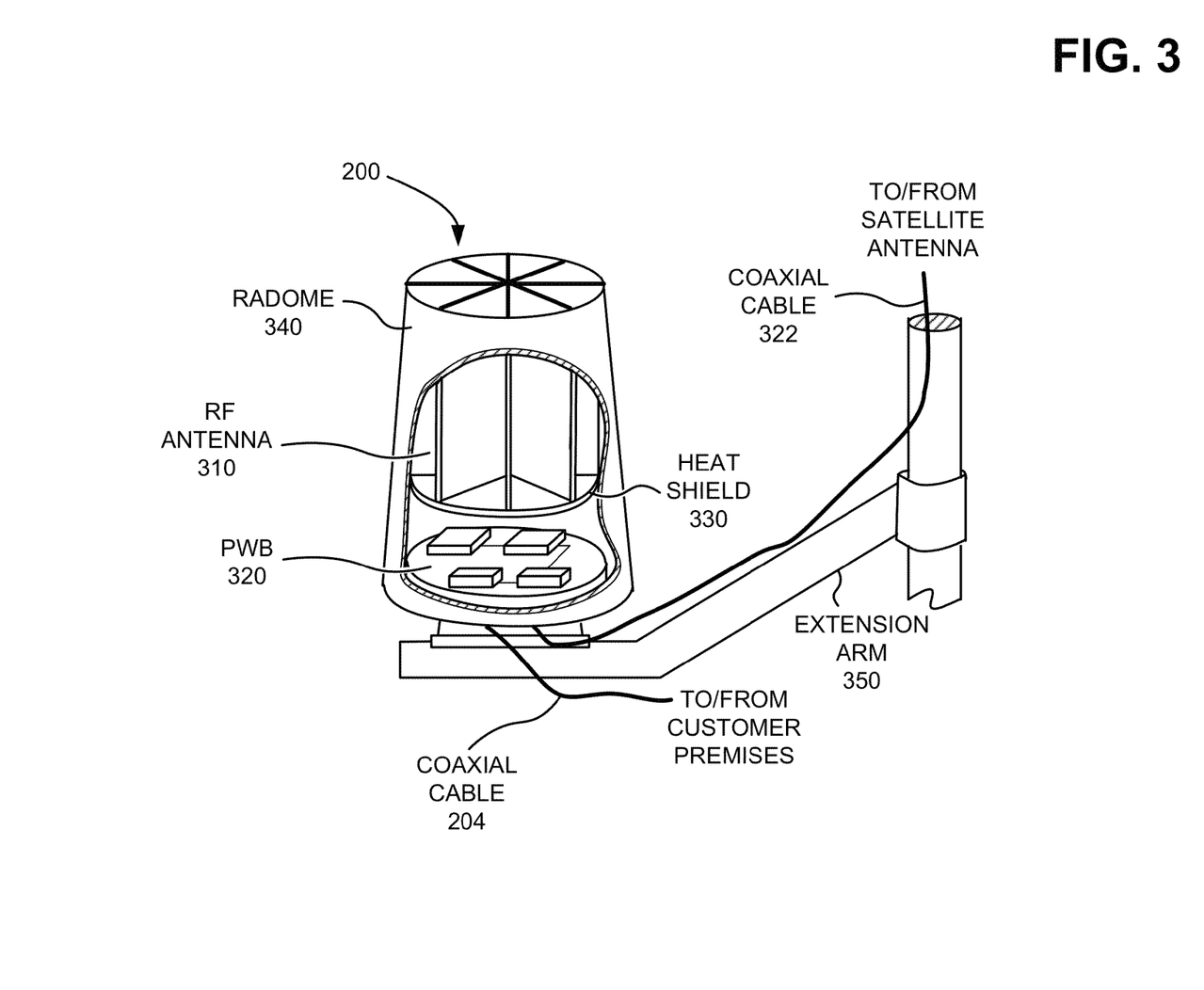
FIG. 3 is a diagram of example components of an outdoor broadband unit of the customer premises network depicted in FIG. 2 according to an implementation described herein.

FIG. 3 is a diagram of example components of outdoor broadband unit 200. As shown in FIG. 3, outdoor broadband unit 200 may include a radio frequency (RF) antenna 310, a printed wiring board (PWB) 320, a heat shield 330, and a radome 340. Outdoor broadband unit 200 may be mounted on an extension arm 350 connected to a pole supporting satellite antenna 202 (not shown).

RF antenna 310 may include an antenna to transmit and/or receive RF signals over the air. RF antenna 310 may, for example, receive RF signals from components on PWB 320 and transmit the RF signals over the air. Also, RF antenna 310 may, for example, receive RF signals over the air and provide the RF signals to components on PWB 320. In one implementation, for example, the components on PWB 320 may communicate with a base station (e.g., eNodeB 140) connected to a network (e.g., LTE network 130) to send and/or receive signals from user devices 270. In one implementation, RF antenna 310 may include a wideband multiple beam antenna, with partially overlapping antenna beams, spanning 360 degrees in azimuth (x-y plane). For example, RF antenna 310 may include between four and eight beams (e.g., to achieve desirable antenna gains and reduction of interference). Additionally, or alternatively, RF antenna 310 may employ two polarizations per beam for 2×2 downlink multiple-input and multiple-output (MIMO) operation.

PWB 320 may include a substrate that mechanically holds and connects various electronic components that are installed onto PWB 320. PWB 320 may include, for example, a laminate structure that routes signals between electronic components that are mounted on PWB 320. Although described as a printed wiring board, PWB 320 could equivalently be referred to as a printed circuit board (PCB), an etched wiring board, or a printed circuit assembly (PCA). PWB 320 may, for example, include components to receive broadband signals via RF antenna 310 and satellite signals from satellite antenna 202 (not shown) via coaxial cable 322 and to combine the broadband and satellite signals to customer premises via coaxial cable 204. Additionally, PWB 320 may receive signals from customer premises via coaxial cable 204 to transmit to via RF antenna 310 to LTE network 130/eNodeB 140.

Heat shield 330 may define a barrier between antenna 310 and PWB 320. Heat shield 330 may include, for example, a heat insulating material. In some implementations, heat shield 330 may also act as a RF shield to prevent stray RF signals, produced by components on PWB 320, from reaching antenna 310.

Radome 340 (shown with cut-away view to reveal RF antenna 310, PWB 320, and heat shield 330) may provide a weatherproof enclosure to protect RF antenna 310, PWB 320, and heat shield 330, and/or other components of outdoor broadband unit 200. Radome 340 may include any RF transparent structure that protects components in an outdoor environment. In implementations herein, radome 340 may enclose RF antenna 310, may be integrated with RF antenna 310, or may support external mounting of RF antenna 310.

Although FIG. 3 shows example components of outdoor broadband unit 200, in other implementations, outdoor broadband unit 200 may include fewer components, different components, differently arranged components, and/or additional components than depicted in FIG. 3. Alternatively, or additionally, one or more components of outdoor broadband unit 200 may perform one or more tasks described as being performed by one or more components of outdoor broadband unit 200.

Figure 4:
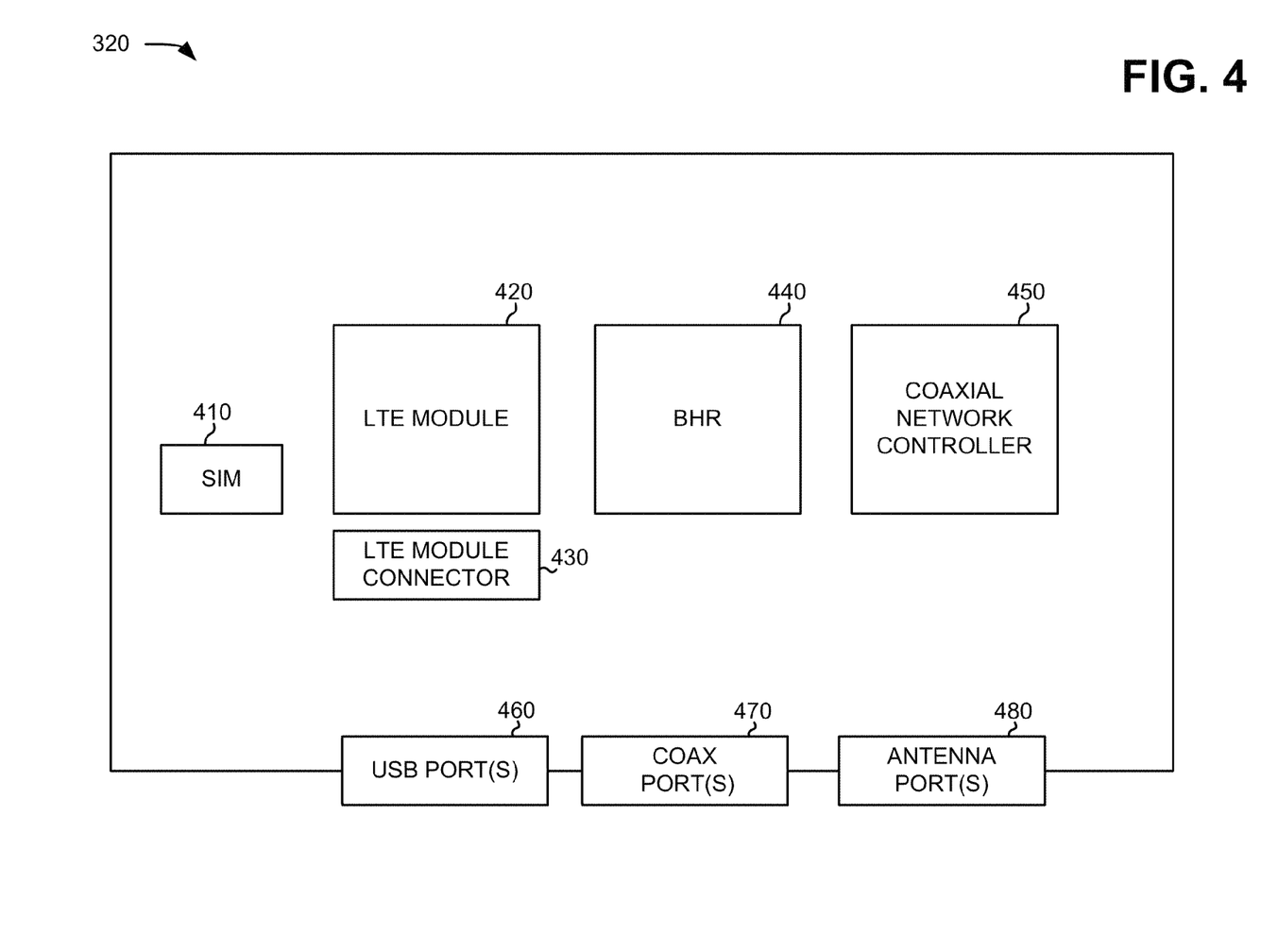
FIG. 4 is a diagram of example components of a printed wiring board (PWB) of the outdoor broadband unit depicted in FIG. 3.

FIG. 4 is a diagram of example components that may be installed on PWB 320. PWB 320 may include a subscriber identity module (SIM) 410, a LTE module 420, a LTE module connector 430, a broadband home router (BHR) 440, and a coaxial network controller 450. PWB 320 may also include a number of connectors to connect to external devices or systems, such as customer premises network 110, RF antenna 310, and/or satellite antenna 202. The connectors shown in FIG. 4 may include: universal serial bus (USB) port(s) 460, coaxial port(s) 470, and antenna port(s) 480. The components shown in FIG. 4 may be implemented as integrated circuits or other electronic components and illustrate various functionality that may be included on PWB 320. For simplicity, conductive traces connecting the components shown in FIG. 4 are not illustrated.

SIM 410 may include a SIM card or integrated circuit (chip). In general, SIM 410 may function to identify and provide services, such as security services, to the subscriber, associated with the customer premises, when connecting to the LTE network through eNodeB 140. SIM 410 may contain, for example, a unique serial number (such as an integrated circuit card identifier (ICCID)), an internationally unique number associated with customer premises network 110, security authentication and ciphering information, and/or a list of the services to which customer premises network 110 has access.

LTE module 420 may include hardware or a combination of hardware and software having communication capability via an air interface. In other words, LTE module 420 may be a control module for the LTE air interface. For example, LTE module 420 may receive broadband signals and/or voice over Internet protocol (VoIP) signals from eNodeB 140 (e.g., via RF antenna 310) and transmit broadband signals and/or VoIP signals to eNodeB 140 (e.g., via RF antenna 310). LTE module 420 may employ frequency division duplex (FDD) and/or time division duplex (TDD) techniques to facilitate downlink and uplink transmissions. In one implementation, LTE module 420 may include a beam selection mechanism that selects the best antenna beam, from RF antenna 310, according to a certain optimization criteria. Beam selection may be performed, for example, during initial installation and/or regular maintenance of outdoor broadband unit 200. Additionally, or alternatively, LTE module 420 may select any of the antenna beams, based on real-time measurements, during normal operation. LTE module 420 may connect to RF antenna 310 through antenna port(s) 490. In one implementation, LTE module 420 may be manufactured as an insertable card, such as a mini-PCI (peripheral component interconnect) card that may be inserted into PWB 320. LTE module connector 430 may include a slot, such as a PCI slot, into which LTE module 420 may be inserted and connected to PWB 320.

In one implementation, LTE module 420 may receive IP data packets originating from a device within a LAN, such as customer premises network 110 and may send the IP data packets toward a destination via an air interface for a WAN, such as network 130. LTE module 420 may also receive, via the air interface for the WAN, other IP data packets, and may send the other IP data packets toward the device within the LAN. LTE module 420 may further receive IP control packets originating from the device within the LAN and implement the IP control packets to initiate a test function or maintenance function for the network device. Additionally, or alternatively, LTE module 420 may receive software updates and other control plane information via the air interface for the WAN.

BHR 440 may include a device for buffering and forwarding data packets toward destinations. BHR 440 may, for instance, receive data packets from eNodeB 140 (e.g., via LTE module 420) and forward the data packets toward user devices 270. In addition, BHR 440 may receive data packets from user devices 270 (e.g., via local router 260) and forward the data packets toward recipient devices via LTE network 130. BHR 440 may also include ports for receiving and transmitting packets, and circuitry for efficiently processing traffic between customer premises network 110 and LTE module 420. For example BHR may include a forwarding table, a switch fabric, and one or more buffers to process traffic. BHR 440 may also include a command interface to communicate with LTE module 420.

Coaxial network controller 450 may provide an interface for Ethernet over coaxial signals, such as signals transmitted over coaxial cable 204 and into customer premises network 110. Coaxial network controller 450 may act as a bridge device to receive signals from LTE module 420 and to convert the signals to an Ethernet over coax signal. The Ethernet over coax signal may be assigned a logical channel (e.g., according to SWiM guidelines) and may be combined with coaxial input from satellite antenna 202. In one implementation, the output from coaxial network controller 450 may be inserted in a Mid-RF MoCA channel that is separate from the 950 MHz to 2150 MHz range of a typical satellite TV system.

PWB 320 may additionally include a number of output ports or physical interfaces. USB port(s) 460 may include ports for connecting to external devices through the USB serial communication standard. USB port(s) 460 may, for example, be used for diagnostic purposes, such as a port through which a technician can connect to PWB 410.

Coaxial port(s) 470 may include an interface for coaxial cables. As previously described, in one implementation, outdoor broadband unit 200 may be connected to a coaxial cable leading to satellite antenna 202 and a coaxial cable (e.g., coaxial cable 204) leading to customer premises network 110. Coaxial network controller 450 may provide a logical interface for coaxial port(s) 470. Antenna port(s) 480 may provide a physical connection to one or more antennas, such as RF antenna 310. In one implementation, antenna port(s) 480 may include a first connection to a RX (receiving) antenna and a second connection to a RX/TX (receiving/transmitting) antenna.

Although FIG. 4 shows example components of PWB 320, in other implementations, PWB 320 may contain fewer components, different components, differently arranged components, and/or additional components than depicted in FIG. 4. Alternatively, or additionally, one or more components of PWB 320 may perform one or more other tasks described as being performed by one or more other components of PWB 320.

Figure 5:
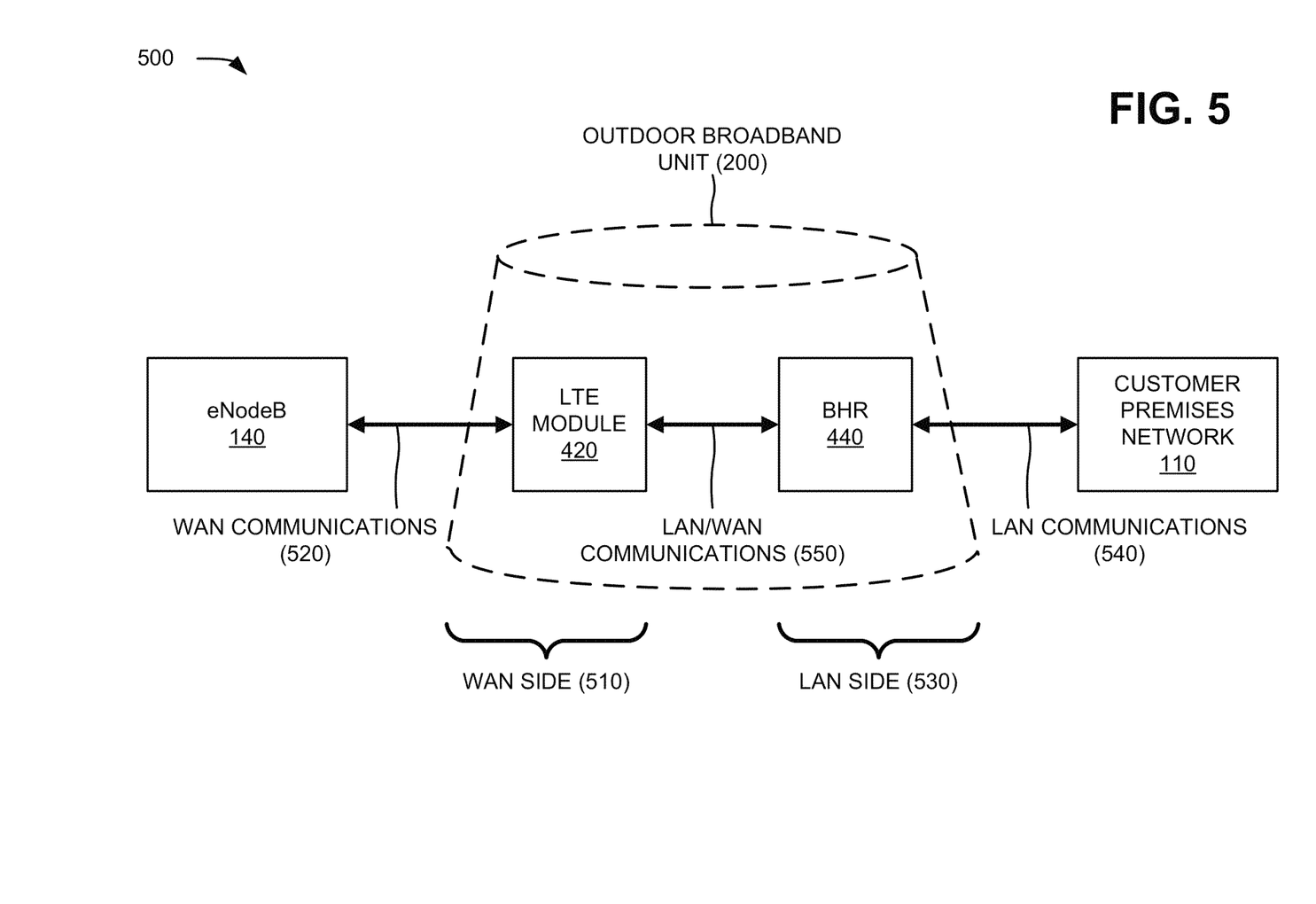
FIG. 5 is a diagram of example operations capable of being performed by an example portion of the system illustrated in FIG. 1.

FIG. 5 is a diagram of example operations capable of being performed by an example portion 500 of environment 100. As shown in FIG. 5, environment portion 500 may include customer premises network 110, eNodeB 140, outdoor broadband unit 200, LTE module 420, and BHR 440. Customer premises network 110, eNodeB 140, outdoor broadband unit 200, LTE module 420, and BHR 440 may include the features described above in connection with one or more of, for example, FIGS. 1-4.

As further shown in FIG. 5, LTE module 420 may make up a WAN side 510 of outdoor broadband unit 200 since LTE module 420 may be associated with a WAN provided via eNodeB 140 and/or network 130 (not shown). In one example implementation, LTE module 420 may be referred to as a "WAN side network device" or a "WAN side component" of outdoor broadband unit 200. eNodeB 140 and LTE module 420 may exchange WAN communications 520. WAN communications 520 may include wireless protocol-based communications associated with the broadband (over LTE) service information exchanged between eNodeB 140 and outdoor broadband unit 200. In one example implementation, WAN communications 520 may include authentication communications (e.g., username and password configurations), provisioning communications associated with outdoor broadband unit 200, etc.

BHR 440 may make up a LAN side 530 of outdoor broadband unit 200 since BHR 440 may be associated with a LAN provided via customer premises network 110. In one example implementation, BHR 440 may be referred to as a "LAN side network device" or a "LAN side component" of outdoor broadband unit 200. Customer premises network 110 and BHR 440 may exchange LAN communications 540. LAN communications 540 may include IP protocol-based communications associated with information exchanged between customer premises network 110 (e.g., user devices 270) and outdoor broadband unit 200. In one example implementation, LAN communications 540 may include requests for video content, requests for audio content, etc.

As further shown in FIG. 5, LTE module 420 and BHR 440 may exchange LAN/WAN communications 550. LAN/WAN communications 550 may include communications that enable outdoor broadband unit 200 to provide a convergence point between wireless protocols (e.g., associated with eNodeB 140) and IP protocols (e.g., associated with user devices 270 of customer premises network 110). In one implementation, LAN/WAN communications 550 may include commands associated with the setup and/or maintenance of a LTE radio link. For example, LAN/WAN communications 550 may include AT commands (e.g., "ATtention" commands for controlling a modem) to provide control instructions to LTE module 420, where "AT" is the prefix that informs LTE module 420 about the start of a command line.

BHR 440 may provide commands to LTE module 420 based on, for example, activity and/or services requested by devices (e.g., user devices 270) within a LAN (e.g., customer premises network 110). For example, in one implementation, BHR 440 may provide Dynamic Host Configuration Protocol (DHCP) client support on WAN side 510 and DHCP server support on LAN side 530. WAN side 510 functionality may be implemented in LTE module 420; however, dynamic WAN addresses and Domain Name System (DNS) addresses obtained by LTE module 420 may be transferred to BHR 440 via AT commands as part of LAN/WAN communications 550. A LAN-side 530 DHCP server function in BHR 440 may add computers (e.g., user devices 270) configured as DHCP clients to a network (e.g., LTE network 130 and/or customer premises network 110). The LAN-side 530 DHCP server function may provide a mechanism for allocating IP addresses to DHCP clients and for delivering network configuration parameters to DHCP clients. For example, a DHCP client may send out a broadcast message on the network requesting an IP address for itself. The DHCP server function may then check a list of available addresses and may lease a local IP address to the DHCP client for a specific period of time and simultaneously designates this IP address as "taken." At this point, the DHCP client may be configured with an IP address for the duration of the lease.

The DHCP client can choose to renew an expiring lease or let it expire. If the DHCP client chooses to renew a lease, the DHCP client will also receive, from the LAN-side 530 DHCP server function on BHR 440, current information about network services, as with the original lease, allowing the DHCP client to update its network configurations to reflect any changes that occurred since the DHCP client first connected to the network. If the DHCP client wishes to terminate a lease before expiration of the lease, the DHCP client can send a release message to the LAN-side 530 DHCP server, which will then make the IP address available for use by other devices.

Although FIG. 5 shows example components of environment portion 500, in other implementations, environment portion 500 may include fewer components, different components, differently arranged components, or additional components than depicted in FIG. 5. Alternatively, or additionally, one or more components of environment portion 500 may perform one or more other tasks described as being performed by one or more other components of environment portion 500.

Figure 6:
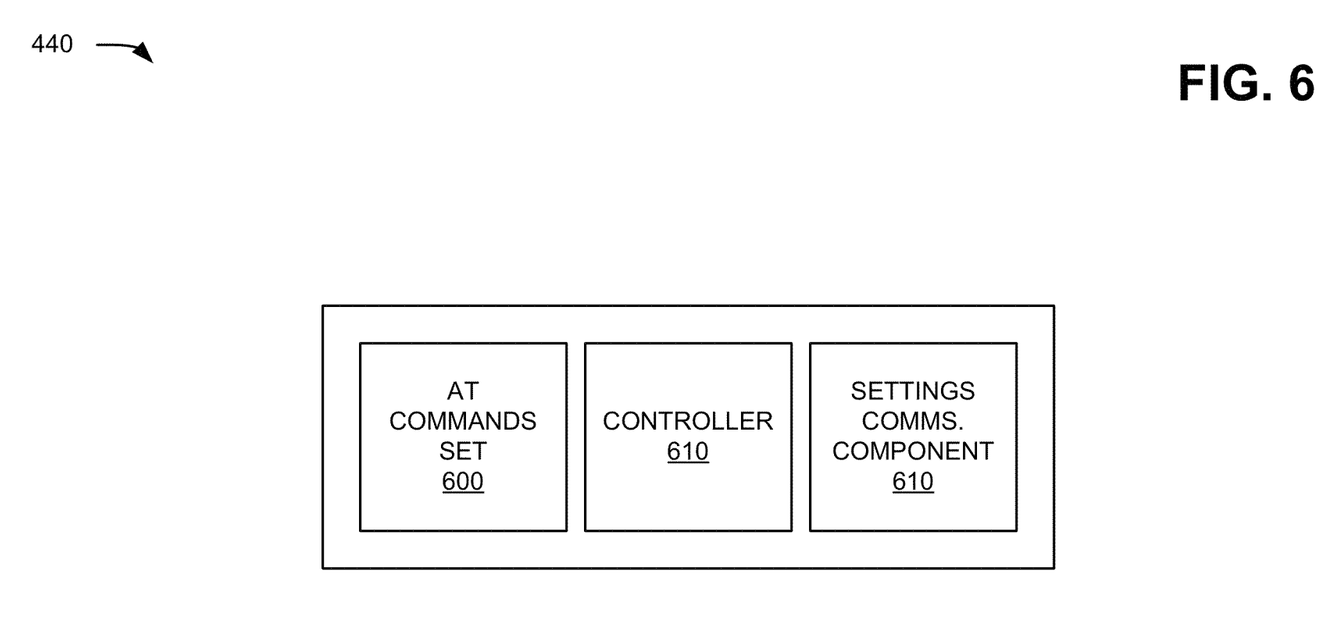
FIG. 6 is a diagram of example functional components a broadband home router (BHR) of the PWB of FIG. 4.
Figure 9:
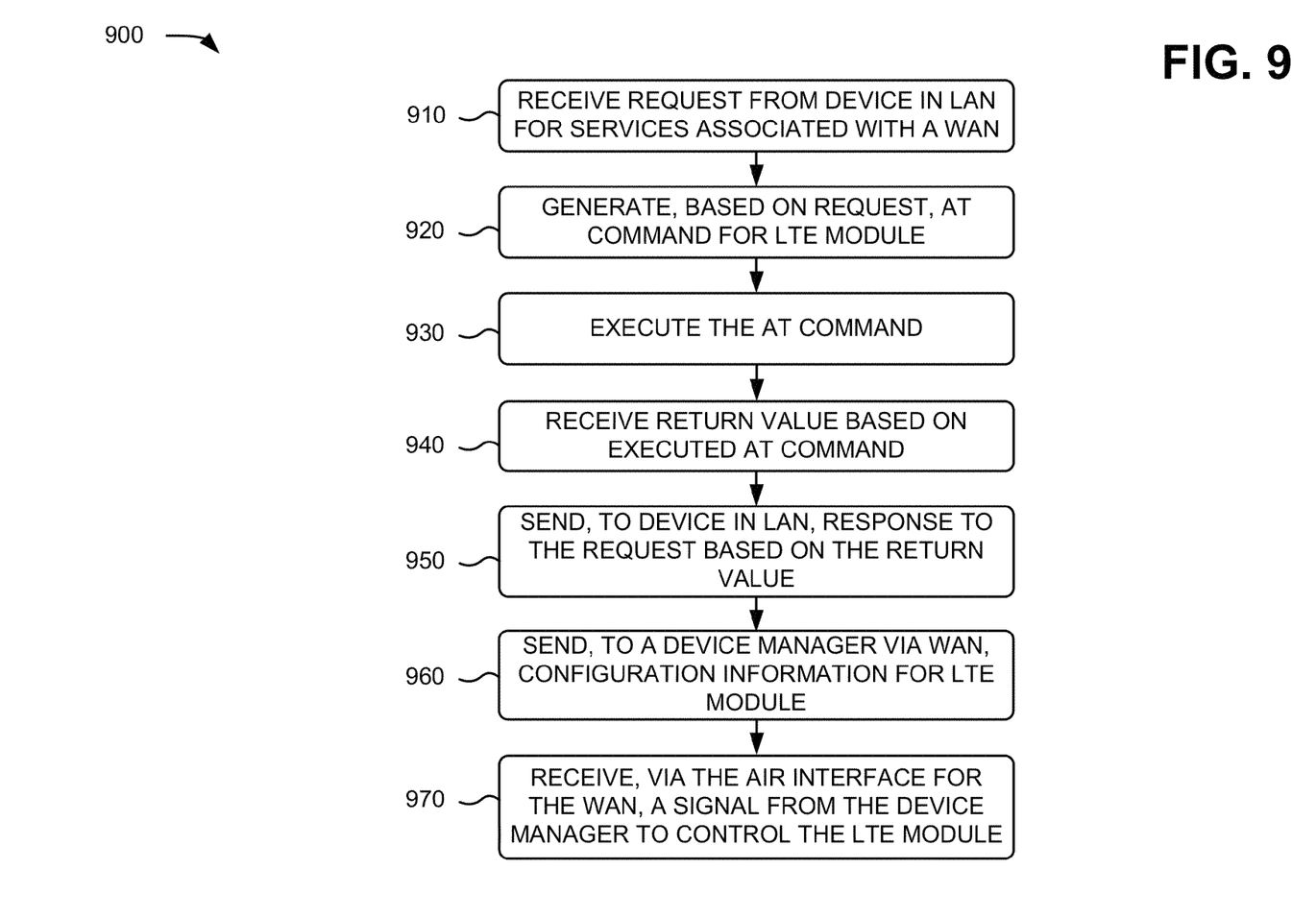
FIG. 9 is a flow diagram of a process for implementing an AT command interface according to an implementation described herein.

FIG. 6 is a diagram of example functional components of BHR 440. In one implementation, the functions described in connection with FIG. 6 may be performed by one or more components of device 900 (FIG. 9). As shown in FIG. 6, BHR 440 may include an AT commands set 600, a controller 610, and a setting communications component 620.

AT commands set 600 may include a set of AT commands to communicate instructions to LTE module 420 (e.g., via BHR 440). AT commands set 600 may be stored, for example, in a memory component of BHR 440. Commands in AT commands set 600 may generally be used for setup and/or maintenance of a LTE radio link by LTE module 420. For example, commands may be used for "bringing up" LTE module 420; getting an IP address and/or renewing an IP address; setting a priority for a link; resetting LTE module 420; adjusting timing; controlling various maintenance, installation, and power-up modes; providing notification of various network events; etc.

In one implementation, commands in AT commands set 600 may include a category of commands that request actions to be performed by a command recipient, a category of commands that request performance related parameters to be retrieved, etc. BHR 440 may initiate a particular AT command and a recipient (e.g., LTE module 420) of the particular AT command may return a response with an "OK" indication, an error code, a retrieved parameter value, etc.

Actions requested by an AT command may include: initializing LTE module 420; power cycling (i.e., turning off and on) LTE module 420; fixing a transmit power setting of LTE module 420; setting an International Mobile Subscriber Identity (IMSI) and number of digits for the mobile network code (MNC) for LTE module 420; setting network parameters for LTE module 420; controlling whether or not LTE module 420 echoes characters; forcing an attempt, by LTE module 420, to select a network operator; transmitting to LTE module 420 a SIM command and required parameters; and/or setting certain parameters.

The certain parameters may include RF parameters, such as a signal to noise ratio (SNR) of a serving cell, a total received signal strength indicator (RSSI), a reference symbol received power (RSRP) of the serving cell, a serving cell ID, a list of cell IDs on which measurements are performed; an average rank, an average transmission mode, an average physical downlink shared channel (PDSCH) block error rate (BLER), an average PDSCH throughput when receiving the PDSCH, an average PDSCH throughput when transmitting on the PDSCH, and a total transmission power when transmitting on the PDSCH. The certain parameters may also include antenna maintenance parameters, such as a short term memory (STM) status, a STM interval, a long term memory (LTM) status, a LTM interval, a LTM time of day, and a current serving beam. The certain parameters may further include link quality indicator (LQI) parameters (e.g., a RSRP high threshold, a RSRP low threshold, a SNR high threshold, and a SNR low threshold); quality of service (QoS) parameters (e.g., a number of provisioned dedicated bearers, dedicated guaranteed bit rate (GBR) bearers information, and dedicated non-GBR bearers information); and miscellaneous parameters (e.g., requesting an IMSI).

Performance related parameters to be retrieved by an AT command may include RF parameters, antenna maintenance parameters, LQI parameters, QoS parameters, and miscellaneous parameters. The RF parameters may include a SNR of a serving cell, a total RSSI, a RSRP of the serving cell, a serving cell ID, a list of cell IDs on which measurements are performed; an average rank, an average transmission mode, an average PDSCH BLER, an average PDSCH throughput when receiving the PDSCH, an average PDSCH throughput when transmitting on the PDSCH, and a total transmission power when transmitting on the PDSCH. The antenna maintenance parameters may include STM status, a STM interval, a LTM status, a LTM interval, a LTM time of day, and a current serving beam. The LQI parameters may include a RSRP high threshold, a RSRP low threshold, a SNR high threshold, and a SNR low threshold. The QoS parameters may include a number of provisioned dedicated bearers, dedicated GBR bearers information, and dedicated non-GBR bearers information. The miscellaneous parameters may include an IMSI and physical layer status.

In one example implementation, AT commands set 600 may include particular AT commands to facilitate communications between BHR 440 and LTE module 420. The AT commands may allow, for example, BHR 440 to perform DHCP server functions and/or allow for remote configuration of LTE module 420 in outdoor broadband unit 200.

Controller 610 may include hardware or a combination of hardware and software to control BHR 440. Controller 610 may, for example, implement an operating system for BHR 440 and may execute processes designed to implement the network protocols used by BHR 440. In one implementation, controller 610 may initiate local actions using commands from AT commands set 600 to initiate setup and/or maintenance of a LTE radio link for outdoor broadband unit 200 based on signals from devices (e.g., user devices 270) in customer premises network 110.

Controller 610, although shown as a single abstract block in FIG. 6, may be implemented through, for example, one or more general purpose processor(s) and one or more computer memories. Processor(s) may include processors, microprocessors, or other types of processing logic that may interpret and execute instructions. The computer memory (also referred to as computer-readable media herein) may include random access memory (RAM), read-only memory (ROM), or another type of storage device that may store information and instructions for execution by processor(s).

Setting communications component 620 may include hardware or a combination of hardware and software to store and communicate LTE module 420 information to an external WAN-side 510 device, such as device manager 180. Setting communications component 620 may also provide an interface to communicate with device manager 180 to allow a WAN-side 510 device to provide signals for remote management of outdoor broadband unit 200 (e.g., using TR-069 standards). For example, setting communications component 620 may receive instructions from and/or send information to device manager 180 using AT commands from AT commands set 600. In one implementation, information stored by setting communications component 620 may include factory (e.g., original equipment manufacturer (OEM)) settings for LTE module 420, customer settings for LTE module 420, user session information, and/or criteria related to reset requirements for LTE module 420. For example, device manager 180 may request setting communications component 620 to provide original factory settings and/or current customer settings of LTE module 420 periodically or upon request to facilitate a reset of outdoor broadband unit 200 from remote location.

Although FIG. 6 shows example functional components of BHR 440, in other implementations, BHR 440 may include fewer functional components, different functional components, differently arranged functional components, or additional functional components than depicted in FIG. 6. Alternatively, or additionally, one or more functional components of BHR 440 may perform one or more other tasks described as being performed by one or more other functional components of BHR 440.

Figure 7:
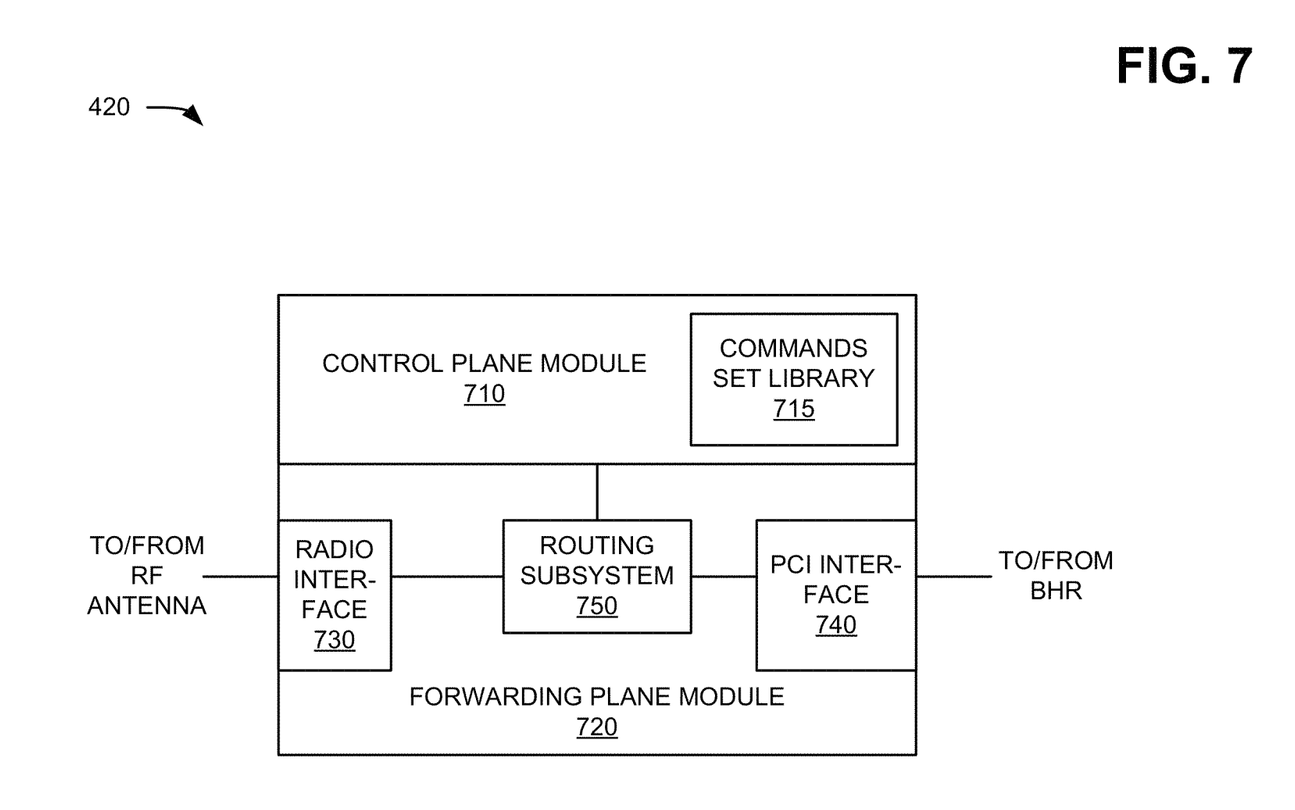
FIG. 7 is a diagram of an example components of a Long Term Evolution (LTE) module of the PWB of FIG. 4.

FIG. 7 is a diagram of example components of LTE module 420. As shown in FIG. 7, LTE module 420 may include a control plane module 710 and a forwarding plane module 720. Control plane module 710 may include a commands set library 715. Forwarding plane module 720 may include a radio interface 730 and a PCI interface 740 interconnected by a routing sub-system 750. In one implementation, control plane module 710 and user plane module 720 may be included in separate chips on LTE module 420.

Control plane module 710 may perform control operations relating to testing and/or maintenance of LTE module 420 and/or connectivity to LTE network 130. In implementations described herein, control plane module 710 may be configured to receive and execute AT commands (e.g., to implement control plane functions, such as DHCP functions, etc.) from BHR 440 to implement functions requested by devices 270 within customer premises network 110 via a MoCA interface. For example, control plane module 710 may receive a command (e.g., an AT command) to setup a LTE radio link or perform a test function. Control plane module 710 may execute the command based on, for example, instructions in commands set library 715.

Commands set library 715 may include a list of commands (e.g., AT commands) that may be received, performed, and/or sent by LTE module 420. For example, control plane module 710 may receive an AT command from BHR 440 and may perform a function and/or provide a response consistent with the command, as defined in commands set library 715. Commands set library 715 may be stored, for example, in a memory component of LTE module 420. Commands in commands set library 715 may generally be used for setup and/or maintenance of a LTE radio link by LTE module 420. For example, commands may be used for "bringing up" LTE module 420, getting an IP address and/or renewing an IP address, setting a priority for a link, resetting LTE module 420, adjusting timing, providing notification of various network events, etc.

Forwarding plane module 720 may receive and process user data, such as broadband traffic, for distribution to/from devices (e.g., user devices 270) in customer premises network 110. For example, forwarding plane module 720 may receive data from LTE network 130 via radio interface 730 and may forward the data toward user devices 270 in customer premises network 110 via PCI interface 740. Forwarding plane module 720 (or components within forwarding plane module 720) may be associated with one or more LAN side 530 IP addresses/ports.

Radio interface 730 may provide an air interface with eNodeB 140 to enable WAN communications (e.g., WAN communications 520) with LTE network 130. PCI interface 740 may provide an electrical connection to BHR 440 to enable LAN communications (e.g., LAN communications 540) with customer premises network 110 over a MoCA interface.

Routing subsystem 750 may receive traffic from radio interface 730 and may route the traffic to toward devices in customer premises network 110 (via PCI interface 740) and/or control plane module 710. Additionally, routing subsystem may receive traffic from customer premises network 110 (via PCI interface 740) and rout traffic toward LTE network 130 and/or control plane module 710. For example, routing subsystem 750 may receive, from BHR 440, traffic with an IP address for control plane module 710 and may forward that traffic to control plane module 710 based on the IP address. Additionally, or alternatively, routing subsystem 750 may forward packets to control plane module 710 based on recognition of an AT command.

Although FIG. 7 shows example functional components of LTE module 420, in other implementations, LTE module 420 may include fewer functional components, different functional components, differently arranged functional components, or additional functional components than depicted in FIG. 7. Alternatively, or additionally, one or more functional components of LTE module 420 may perform one or more other tasks described as being performed by one or more other functional components of LTE module 420.

Figure 8:
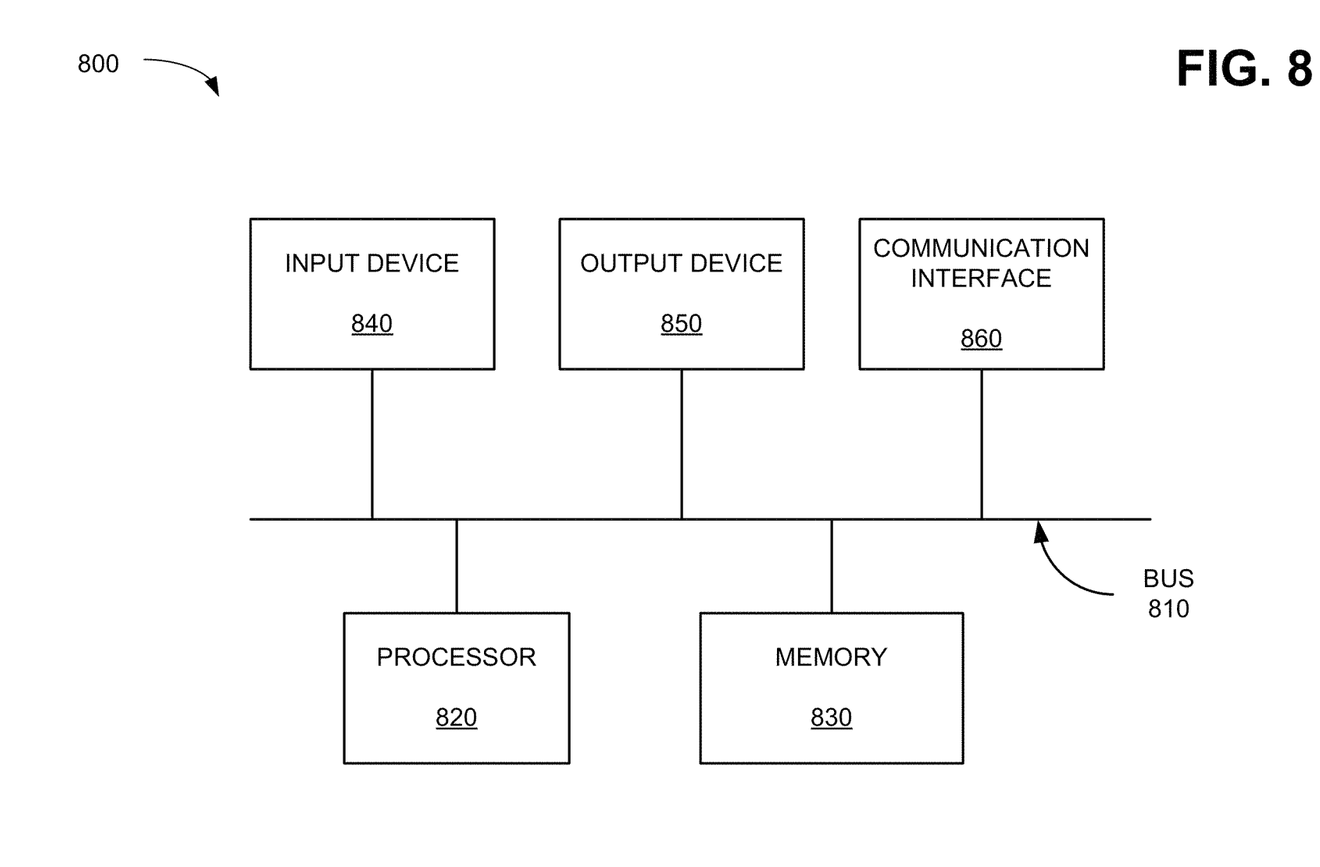
FIG. 8 is a diagram of example components of a device that may correspond to one of the devices of the system of FIG. 1 or the customer premises network of FIG. 2.

FIG. 8 is a diagram of example components of a device 800 that may correspond to one of the devices of system 100 and/or customer premises network 110 (e.g., SIM 410, LTE module 420, BHR 440, coaxial network controller 450, local router 260, etc.). As shown, device 800 may include a bus 810, a processor 820, a memory 830, an input device 840, an output device 850, and a communication interface 860.

Bus 810 may permit communication among the components of device 800. Processor 820 may include one or more processors and/or microprocessors that interpret and execute instructions. Additionally or alternatively, processor 820 may be implemented as or include one or more ASICs, FPGAs, or the like. Memory 830 may include a RAM or another type of dynamic storage device that stores information and instructions for execution by processor 820, a ROM or another type of static storage device that stores static information and instructions for processor 820, and/or some other type of magnetic or optical recording medium and its corresponding drive for storing information and/or instructions.

Input device 840 may include a device that permits an operator to input information to device 800, such as a keyboard, a keypad, a mouse, a pen, a microphone, a touch screen, one or more biometric mechanisms, and the like. Output device 850 may include a device that outputs information to the operator, such as a display, a speaker, etc.

Communication interface 860 may include any transceiver-like mechanism that allows device 800 to communicate with other devices and/or systems. For example, communication interface 860 may include mechanisms for communicating with other devices, such as devices of FIG. 1 or FIG. 2.

Device 800 may perform certain functions in response to processor 820 executing software instructions contained in a computer-readable medium, such as memory 830. A computer-readable medium may be defined as a non-transitory memory device. A memory device may include memory space within a single physical memory device or spread across multiple physical memory devices. The software instructions may be read into memory 830 from another computer-readable medium or from another device via communication interface 860. The software instructions contained in memory 830 may cause processor 820 to perform processes that will be described later. Alternatively, hardwired circuitry may be used in place of or in combination with software instructions to implement processes consistent with embodiments described herein. Thus, systems and methods described herein are not limited to any specific combination of hardware circuitry and software.

Although FIG. 8 illustrates example components of device 800, in some implementations, device 800 may include fewer components, different components, differently arranged components, or additional components than those depicted in FIG. 8. Additionally, or alternatively, one or more components of device 800 may perform one or more tasks described as being performed by one or more other components of device 800.

FIG. 9 is a flow diagram of a process 900 for implementing an AT command interface according to an implementation described herein. In one implementation, process 900 may be performed by outdoor broadband unit 200. In other implementations, some or all of process 900 may be performed by another device or a group of devices separate from and/or possibly remote from outdoor broadband unit 200 and/or including outdoor broadband unit 200.

Process 900 may include receiving a request, originating from a device in a LAN, for services associated with a WAN (block 910), and generating, based on the request, an AT command for a LTE module (block 920). For example, outdoor broadband unit 200 (e.g., BHR 440) may provide commands to LTE module 420 based on, for example, activity and/or services requested by devices (e.g., user devices 270) within a LAN (e.g., customer premises network 110). BHR 440 may receive signals from user devices 270 via a coaxial LAN connection (e.g., MoCA interface), and, in response, may assemble an AT command from the AT commands set 600 to retrieve required information from LTE module 420.

Process 900 may also include executing the AT command (block 930), receiving a return value based on the executed AT command (block 940), and sending, to the device in the LAN, a response to the request based on the return value (block 950). For example, LTE module 420 may receive an AT command from BHR 440 to perform a function related to setup of a LTE radio link or performing a test function. LTE module 420 may execute the command based on, for example, instructions in commands set library 715, and provide a return value to BHR 440. BHR 440 may, in turn, include the return value from LTE module 420 in a response to a user device 270.

Process 900 may additionally include sending, to a device manager via the WAN, configuration information for the LTE module (block 960), and receiving, via the air interface for the WAN, a signal from the device manager to control the LTE module (block 970). For example, BHR 440 may store and communicate LTE module 420 configuration information to an external WAN-side 510 device, such as device manager 180. BHR 440 may also provide an interface to communicate with device manager 180 to allow a WAN-side 510 device to provide signals for remote management of outdoor broadband unit 200 (e.g., using TR-069 standards). BHR 440 may receive instructions from and/or send information to device manager 180 using AT commands from AT commands set 600.

Systems and/or methods described herein may include an outdoor broadband unit that uses a library of AT commands to communicate between a WAN-side LTE module and a LAN-side broadband home router. The AT commands may be used for control plane operations to facilitate, LTE network sessions, for devices within the LAN.

The foregoing description of implementations, described above, provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 9, the order of the blocks may be modified in other implementations. Further, non-dependent blocks may be performed in parallel.

Also, certain portions of the implementations may have been described as a "component" or "module" that performs one or more functions. The terms "component" and "module" may include hardware, such as a processor, an ASIC, or a FPGA, or a combination of hardware and software (e.g., software running on a processor).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:
   a satellite antenna to receive communications from a satellite network; and
   an outdoor broadband unit connected to an external portion of a customer premises, along with the satellite antenna, the outdoor broadband unit including:
      a radio frequency (RF) antenna to communicate with a Long-Term Evolution (LTE) network,
      a coaxial network controller to provide an interface to a local area network (LAN), associated with the customer premises, for Ethernet over coaxial signals,
      a LTE module to implement an air interface for the LTE network, the LTE module including a library of commands associated with control plane functions for a LTE radio link wherein the commands include attention (AT) commands, and
      a broadband home router to route traffic, from the LAN, to the LTE module and to provide one or more of the commands to the LTE module, to implement control plane functions for the LTE network, based on activity within the LAN.

2. The system of claim 1, where the library of commands includes commands to:
   initiate the LTE module,
   obtain an IP address for a device within the LAN,
   reset the LTE module, and
   invoke a test mode for the LTE module.

3. The system of claim 1, where the outdoor broadband unit further includes a subscriber identity module (SIM) to provide services for the LTE network, and where the library of commands includes commands to:
   set an International Mobile Subscriber Identity (IMSI) and a number of digits for the mobile network code (MNC) associated with the LTE module; or
   request a current IMSI for the LTE module.

4. The system of claim 1, where the broadband home router is coupled to the LTE module via a peripheral component interconnect (PCI) interface.

5. The system of claim 1, where the broadband home router includes a Multimedia over Coax Alliance (MoCA)-compliant interface to send and receive traffic from devices in the LAN.

6. The system of claim 1, where the library of commands includes commands to:
   return a physical layer signal-to-noise ratio (SNR),
   provide one or more of a received signal strength indication, a reference signal received power, or a reference signal received quality, and
   establish a particular transmit power setting.

7. A system comprising:
   a satellite antenna to receive communications from a satellite network; and
   an outdoor broadband unit connected to an external portion of a customer premises, along with the satellite antenna, the outdoor broadband unit including:
      a radio frequency (RF) antenna to communicate with a Long-Term Evolution (LTE) network,
      a coaxial network controller to provide an interface to a local area network (LAN), associated with the customer premises, for Ethernet over coaxial signals,
      a LTE module to implement an air interface for the LTE network, the LTE module including a library of commands associated with control plane functions for a LTE radio link wherein the library of commands include commands to:
         initiate the LTE module,
         obtain an IP address for a device within the LAN,
         reset the LTE module, and
         invoke a test mode for the LTE module, and
      a broadband home router to route traffic, from the LAN, to the LTE module and to provide one or more of the commands to the LTE module, to implement control plane functions for the LTE network, based on activity within the LAN.

8. The system of claim 7, where the commands associated with control plane functions for the LTE radio link include attention (AT) commands.

9. The system of claim 7, where the outdoor broadband unit further includes a subscriber identity module (SIM) to provide services for the LTE network, and where the library of commands includes commands to:
- set an International Mobile Subscriber Identity (IMSI) and a number of digits for the mobile network code (MNC) associated with the LTE module; or
- request a current IMSI for the LTE module.

10. The system of claim 7, where the broadband home router is coupled to the LTE module via a peripheral component interconnect (PCI) interface.

11. The system of claim 7, where the broadband home router includes a Multimedia over Coax Alliance (MoCA)-compliant interface to send and receive traffic from devices in the LAN.

12. The system of claim 7, where the library of commands includes commands to:
- return a physical layer signal-to-noise ratio (SNR),
- provide one or more of a received signal strength indication, a reference signal received power, or a reference signal received quality, and
- establish a particular transmit power setting.

13. A system comprising:
- a satellite antenna to receive communications from a satellite network; and
- an outdoor broadband unit connected to an external portion of a customer premises, along with the satellite antenna, the outdoor broadband unit including:
  - a radio frequency (RF) antenna to communicate with a Long-Term Evolution (LTE) network,
  - a coaxial network controller to provide an interface to a local area network (LAN), associated with the customer premises, for Ethernet over coaxial signals,
  - a LTE module to implement an air interface for the LTE network, the LTE module including a library of commands associated with control plane functions for a LTE radio link, and
  - a broadband home router to route traffic, from the LAN, to the LTE module and to provide one or more of the commands to the LTE module, to implement control plane functions for the LTE network, based on activity within the LAN,
  - wherein the broadband home router is coupled to the LTE module via a peripheral component interconnect (PCI) interface.

14. The system of claim 13, where the commands associated with control plane functions for the LTE radio link include attention (AT) commands.

15. The system of claim 13, where the library of commands includes commands to:
- initiate the LTE module,
- obtain an IP address for a device within the LAN,
- reset the LTE module, and
- invoke a test mode for the LTE module.

16. The system of claim 13, where the outdoor broadband unit further includes a subscriber identity module (SIM) to provide services for the LTE network, and where the library of commands includes commands to:
- set an International Mobile Subscriber Identity (IMSI) and a number of digits for the mobile network code (MNC) associated with the LTE module; or
- request a current IMSI for the LTE module.

17. The system of claim 13, where the broadband home router includes a Multimedia over Coax Alliance (MoCA)-compliant interface to send and receive traffic from devices in the LAN.

18. The system of claim 13, where the library of commands includes commands to:
- return a physical layer signal-to-noise ratio (SNR),
- provide one or more of a received signal strength indication, a reference signal received power, or a reference signal received quality, and
- establish a particular transmit power setting.

19. A method implemented by an outdoor broadband unit, the method comprising:
- receiving, via a satellite antenna, communications from a satellite network for a first device with a local area network (LAN) associated with a broadband home router;
- receiving, by the broadband home router within the outdoor broadband unit and via a coaxial cable interface, a request for services associated with a wide area network (WAN), the request originating from a second device within the LAN;
- generating, by the broadband home router and based on the request, an attention (AT) command to a Long-Term Evolution (LTE) module, within the outdoor broadband unit, the LTE module providing an air interface for the WAN;
- executing, by the LTE module, the AT command;
- receiving, by the broadband home router and from the LTE module, a return value based on the executed AT command;
- sending, by the broadband home router and via the coaxial cable interface, communications from a satellite network for the first device; and
- sending, by the broadband home router and to the second device via the coaxial cable interface, a response to the request based on the return value.

20. The method of claim 19, further comprising:
- sending, via the air interface for the WAN and to a device manager, configuration information for the LTE module; and
- receiving, via the air interface for the WAN, a signal from the device manager to control the LTE module.

* * * * *